United States Patent [19]

Huwyler

[11] 4,118,638

[45] Oct. 3, 1978

[54] SYSTEM OF DISTRIBUTING PILOT SIGNALS

[75] Inventor: Franco Huwyler, Milan, Italy

[73] Assignee: Fabbrica Italiana Magneti Marelli S.p.A., Milan, Italy

[21] Appl. No.: 750,502

[22] Filed: Dec. 14, 1976

[30] Foreign Application Priority Data

Dec. 19, 1975 [IT] Italy .............................. 30490 A/75

[51] Int. Cl.² .............................................. H02J 4/00
[52] U.S. Cl. ................................... 307/11; 307/10 R; 340/163; 340/168 R; 328/75
[58] Field of Search ................................ 307/10 R, 11; 340/168 R, 168 B, 163; 328/75

[56] References Cited

U.S. PATENT DOCUMENTS

| | | | |
|---|---|---|---|
| 3,544,803 | 12/1970 | Taylor | 340/168 R |
| 3,652,865 | 3/1972 | Holt | 307/10 R |
| 3,819,949 | 6/1974 | Ueda et al. | 307/10 R |

Primary Examiner—Robert K. Schaefer
Assistant Examiner—Morris Ginsburg
Attorney, Agent, or Firm—Ostrolenk, Faber, Gerb & Soffen

[57] ABSTRACT

Apparatus for generating a plurality of pilot signals is disclosed. First and second sets of timers are fed by a common system clock. Each timer of both the first and second sets of timers is adapted to generate a gating pulse a predetermined time period after the initiation of a timing cycle in accordance with a timing characteristic peculiar to each timer. The timing characteristic of the timers in both the first and second sets are chosen such that at least one of the timers in the first set generates a gating pulse at the same time that at least one of the timers in the second set generates a gating pulse. The gating signals generated by each of the first set of timers are applied to one input of each of a plurality of two input pilot signal gates. The gating signal generated by each of the second set of timers is applied to the remaining input of a different one of the plurality of two input pilot signal gates. Each of the pilot signal gates generates a pilot signal whenever a gating signal is applied to each of its inputs.

15 Claims, 9 Drawing Figures

SYSTEM OF DISTRIBUTING PILOT SIGNALS

BACKGROUND OF THE INVENTION

This invention relates to a system for the distribution of pilot signals, particularly distribution of electrical energy.

Known systems for distribution of electrical energy in offices, plants, hospitals, residences, etc., are normally based on one of two typical schemes: firstly, the electrical energy required for supplying the equipment to be operated is controlled by switches arranged at the most convenient locations for use; and secondly, the electrical energy required for supplying the equipment is controlled by suitable relays operated through suitable electric circuits by control pushbuttons. The wiring required in both of the above systems are substantially complex. As a result, the material and labor costs of installation are high. Additionally the prior art systems are highly rigid since it is difficult to modify the number of wires and the location of the equipment being controlled and the controls controlling the system. This is particularly true because of the commonly established practice of having such circuits in proper walled canalizations.

It is the object of the present invention to provide a novel system for general distribution of pilot signals, and particularly distribution of electrical energy, enabling to provide a saving both in the amount of required wires and installation labor, as well as a large use of flexibility, so that either the number or the location of the operation equipments and control members can be readily modified.

BRIEF SUMMARY OF THE INVENTION

According to the invention, the foregoing objects are obtained by a pilot signal distributing system comprising a high frequency pulse generator; first and second pluralities of timing circuits that are connected to the input of a pulse distributing line for cyclical and concurrent operation; each of the circuits being capable of providing a gating signal, after some time peculiar to each circuit, from operation starting; the gating signals provided by the timing circuits of the first plurality being supplied through respective normally open switches, as operated by an operator, to a common gating signal transmission line; at least one timing circuit of the first plurality having the same characteristic time as at least one timing circuit of the second plurality, whereby operative couplings are provided between the circuits of said first and second pluralities; and further comprising a plurality of receiver devices which at one input are connected to the output of a timing circuit of said second plurality to receive a first gating signal, and at another input to said transmission line to receive a further gating signal and at the output to an operating circuit which is energized by a pilot signal when the gating signals are simultaneously applied to the input of the receiver device; the arrangement being such that a pilot signal is provided at the output of said receiver device(s) when the latter have the input thereof supplied with gating signals from the timing circuits of said first and second pluralities having the same characteristic times.

BRIEF DESCRIPTION OF THE INVENTION

By mere way of example, the present system will now be described with reference to some preferred embodiments as shown in the accompanying drawings, in which.

DETAILED DESCRIPTION OF THE PREFERRED EMBODIMENTS

Figure 1:
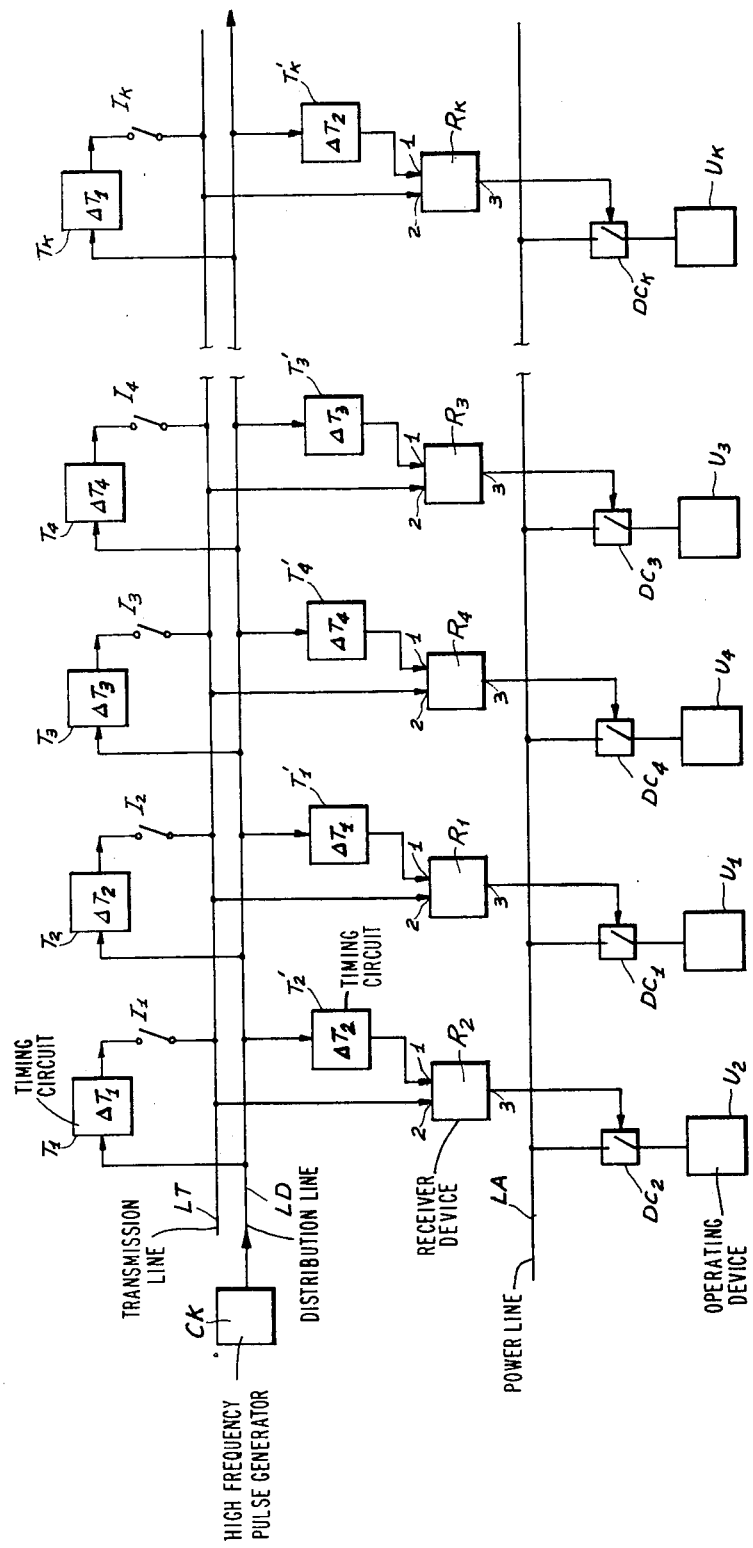
FIG. 1 is a block diagram for a system constructed in accordance with the principles of the present invention.

Referring to the general scheme of FIG. 1, CK designates a high frequency pulse generator (clock) which generates a time period indicating pulse at the initiation of each of a plurality of system timing periods. LD designates distribution line which receivers time period initiation pulses, and $T_1, T_2 \ldots T_K$ and $T_1', T_2' \ldots T_K'$, respectively, designate a first and a second plurality of timing circuits whose inputs are connected to line LD such that each of the timing circuits are cyclically and simultaneously operated responsive to each of the time periods indicating pulses. The timing circuits generate a signal, hereinafter referred to as "gating signal", a given time interval $\Delta T_1, \Delta T_2, \ldots \Delta T_K$ after the initiation of each of the system timing periods. A particular time interval $\Delta T_1, \Delta T_2, \ldots \Delta T_K$ is peculiar to each circuit. The gating signals generated by the first plurality of timing circuits $T_1, T_2, \ldots T_K$ are supplied to a common gating signal transmission line LT through respective switches $I_1, I_2, \ldots I_K$, which are normally open and which close on an operator's command. These switches reopen as soon as the command is cut off.

One or more timing circuits of the first plurality of timing circuits have the same characteristic time interval as one or more timing circuits of the second plurality of timing circuits, so that operative couplings between the circuits of said first and second plurality of timing circuits can be provided. As used herein, the term "operatively coupled" timing circuits are those circuits in the first and second sets of timing circuits which have the same characteristic time intervals.

In the example disclosed, the characteristic time interval $\Delta T_1$ associated with both timing circuits $T_1$ and $T_K$ is the same as that for timing circuit $T_1'$; the characteristic time interval $\Delta T_2$ for timing circuit $T_2$ is the same as that for timing circuits $T_2'$ and $T_K'$; the characteristic time interval $\Delta T_3$ for $T_3$ is the same as that for timing circuit $T_3'$ and the characteristic time interval $\Delta T_4$ for timing circuit $T_4$ is the same as that for timing circuit $T_4'$ to provide for operative coupling of the following circuits: $T_1$ and $T_K$ with $T_1'$; $T_2$ with $T_2'$ and $T_K'$; $T_3$ with $T_3'$; and $T_4$ with $T_4'$.

Still referring to FIG. 1, $R_1, R_2, \ldots R_K$ designate a plurality of receiver devices, and $U_1, U_2, \ldots U_K$ designate a plurality of operating devices supplied by line LA, which may be an electric, pneumatic or the like line. As shown, supply for $U_1$, $U_2$, ... $U_K$ can be provided through respective control devices $DC_1$, $DC_2$, ... $DC_K$ under the control of receivers $R_1$, $R_2$, ... $R_K$. An input 1 of each of the receivers receives a gating signal from the output of a different one of the timing circuits $T_1'$, $T_2'$, ... $T_K'$. An input of each receiver device receives another gating signal from line LT. The output 3 of each receiver is coupled to a respective control device $DC_1$, $DC_2$, ... $DC_K$. A pilot signal is generated by each receiver device when a gating signal appears at both inputs to the receiver. As a result, each operating device is activated only when gating signals from operatively coupled timing circuits of said first and second plurality of timing circuits are simultaneously applied to both inputs of the receiver device associated with the particular operating device. For example, operating device $U_4$ is supplied only when switch $I_4$ is operated and devices $U_2$ and $U_K$ are simultaneously supplied only when switch $I_2$ is operated.

Timing circuits $T_1$, $T_2$, $T_K$ and $T_1'$, $T_2'$, ... $T_K'$ can be provided in different ways, as far as capable of operating as above described; accordingly, the pulses emitted from clock CK are of a type which can be detected by the type of timing circuit selected so that the timing circuits selected can be simultaneously and cyclically operated responsive to each time period initiating pulse generated by the clock CK. Moreover, depending on the type of timing circuits selected, it is possible to utilize separate transmission and pulse distribution lines LT and LD (as shown in FIG. 1), or a single line for both signals (see FIGS. 6 and 8).

Receivers $R_1$, $R_2$, ... $R_K$ and control devices $DC_1$, $DC_2$, ... $DC_K$, respectively, can be simple logical gates and electromagnetic relays or electrovalves; switches $I_1$, $I_2$, ... $I_K$ can be simple pushbuttons, electronic switches or the like, as required. Such switches should, however, be capable of remaining in a closed condition for a sufficient time interval.

When having predetermined the installation location for each of the timing circuits, the above shown system makes it possible to minimize the length of line LD (and also line LT) which has only to meet the requirement of interconnecting all of said circuits. Similarly, the length of supply line LA can be minimized. For example, the lines could be combined, whereby the whole installation can be arranged in a single cable and in a single canalization.

Additionally, since each of the timing circuits and each of the operating devices can be placed in any desired location, the desired flexibility is provided; it being possible to modify the location for each of the devices without altering the system operation.

It is a further advantage of the present system that all of the timing circuits are identical, the only difference residing in the different formulation for providing the different characteristic time intervals. The receiving circuits are also identical.

The system will now be disclosed as provided with two types of timing circuits, one of which uses monostable multivibrators (FIGS. 2 and 3), and the other of which uses electronic counters (FIGS. 4 to 8). In both cases, the receivers are made with AND gates.

Figure 2:
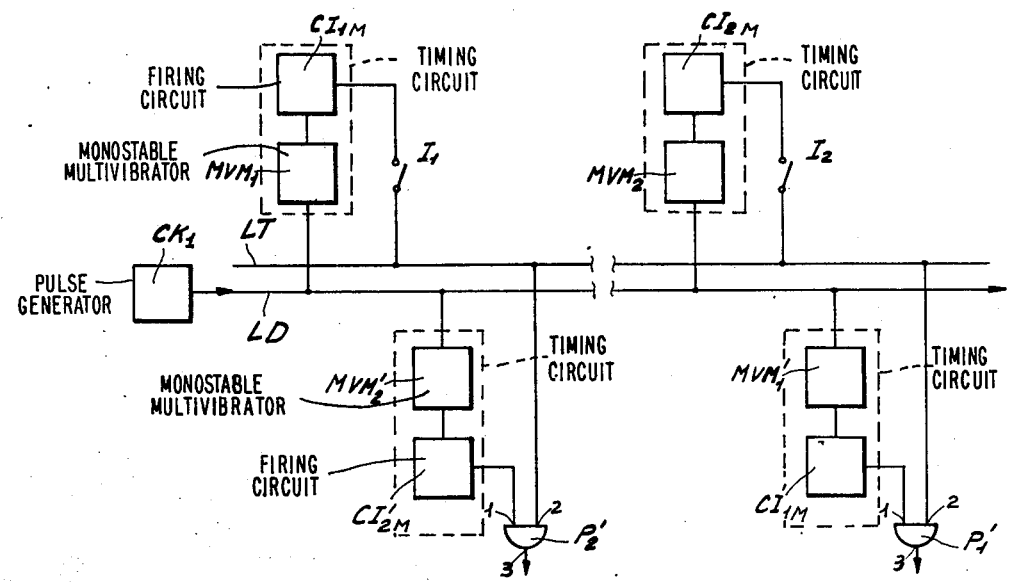
FIG. 2 shows a first embodiment for the system of FIG. 1.
Figure 3:
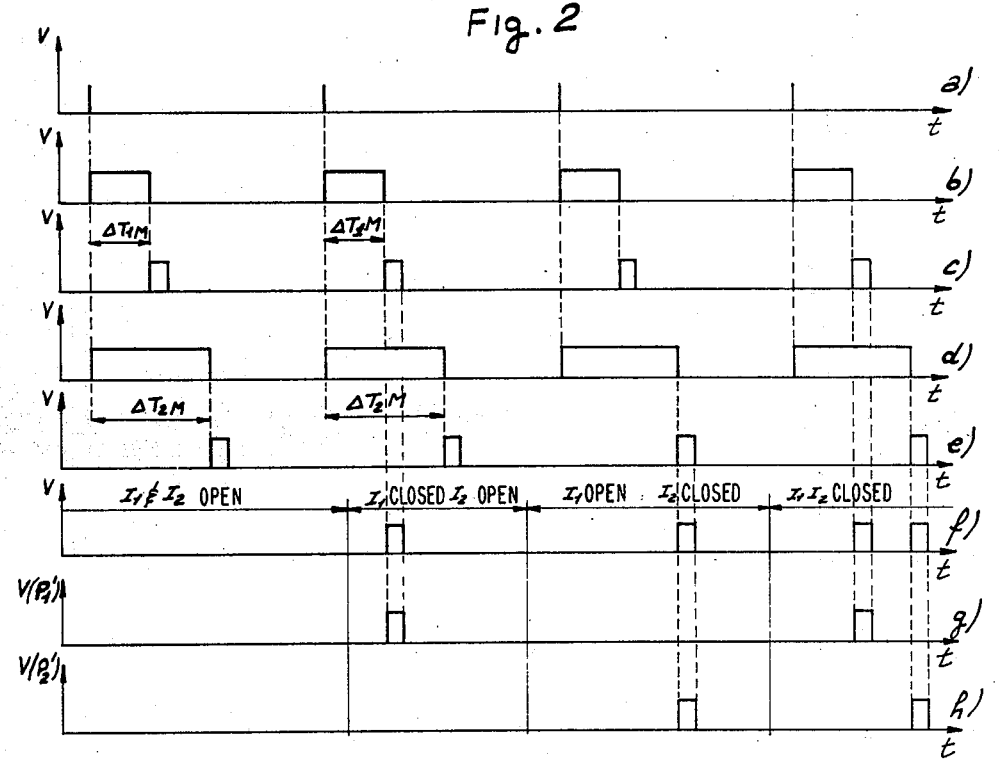
FIG. 3 is an operation diagram of the embodiment shown in FIG. 2.

In the embodiment shown in FIG. 2, each of the timing circuits comprise a monostable multivibrator and a firing circuit. The first and second plurality of timing circuits are designated at $MVM_1$-$CI_{1M}$, $MVM_2$-$CI_{2M}$ and $MVM_1'$-$CI_{1M'}$, $MVM_2'$-$CI_{2M'}$, respectively.

For purposes of illustration, it will be assumed that timing circuit $MVM_1$-$CI_{1M}$ is operatively coupled with $MVM_1'$-$CI_{1M'}$, and timing circuit $MVM_2$-$CI_{2M}$ is operatively coupled with $MVM_2'$-$CI_{2M'}$. Multivibrators $MVM_1$, $MVM_2$, $MVM_1'$ and $MVM_2'$ are connected to line LD (which is separated from line LT) and receive the time period initiation pulses (FIG. 3a) provided by clock $CK_1$.

Each firing circuit $CI_{1M}$, $CI_{2M}$, $CI_{1M'}$ and $CI_{2M'}$ provides a gating signal at its end of the conducting state of the respective multivibrators; the length of said conducting state defining the characteristic time for it respective timing circuit. In accordance with the above assumption, the conduction time for multivibrator $MVM_1$ is the same as that for $MVM_1'$, and conduction time for multivibrator $MVM_2$ is the same as that for $MVM_2'$. FIG. 3b shows the output signal generated by multivibrators $MVM_1$ and $MVM_1'$. FIG. 3c shows the gating signal generated by firing circuits $CI_{1M}$ and $CI_{1M'}$. As shown in FIG. 3c, each gating signal is generated by firing circuits $CI_{1M}$ and $CI_{1M'}$ $\Delta T_{1M}$ seconds after the initiation of the new system timing period as defined by the time interval initiation pulses generated by clock $CK_1$. It, after a time interval $\Delta T_{1M}$ from the generation of time interval indication pulse, switch $I_1$ is closed for a sufficient time, inputs 1 and 2 of gate $P_1'$ will have simultaneously applied thereto the two gating signals; one applied to input 1 directly by firing circuit $CI_{1M'}$ and one applied to input 2 through line LT by firing circuit $CI_{1M}$. In such a case, a pilot signal will be generated at output 3 of gate $P_1'$ operating its respective operating device (not shown).

Similarly, FIGS. 3d and 3e illustrate, respectively, the outputs of multivibrators $MVM_2$ and $MVM_2'$ and the gating signals generated by firing circuits $CI_{2M}$ and $CI_{2M'}$ following the time interval $\Delta T_{2M}$.

Should switch $I_2$ be closed for a sufficient time, after the termination of time periods $\Delta T_{2M}$ inputs 1 and 2 of gate $P_2'$ will have simultaneously applied thereto the two gating signals provided by firing circuits $CI_{2M'}$ and $CI_{2M}$, respectively. Should such a condition occur, a pilot signal will appear at the output of gate $P_2'$.

FIG. 3f shows the gating signals appearing on line LT under the following opening and closing conditions for the two switches $I_1$ and $I_2$:

$I_1$ and $I_2$ open: no signal appears on line LT;

$I_1$ closed and $I_2$ open: those signals appear as shown in FIG. 3c;

$I_1$ open and $I_2$ closed: those signals appear as those shown in FIG. 3e;

$I_1$ and $I_2$ closed: both signals of FIG. 3c and FIG. 3e appear, but time separated.

FIGS. 3g and 3h show the pilot signals at the output of gates $P_1'$ and $P_2'$, respectively, under the above mentioned conditions of opening and closing for switches $I_1$ and $I_2$.

From the foregoing, it is apparent that a pilot signal appears at the output of any given gate only when the switch associated with that gate is closed.

Figure 4:
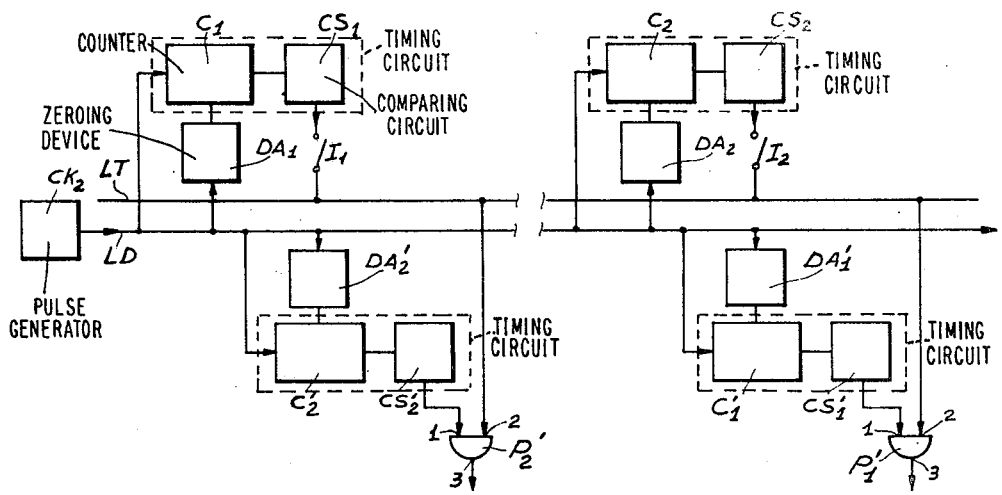
FIG. 4 shows a second embodiment for the system of FIG. 1.
Figure 5:
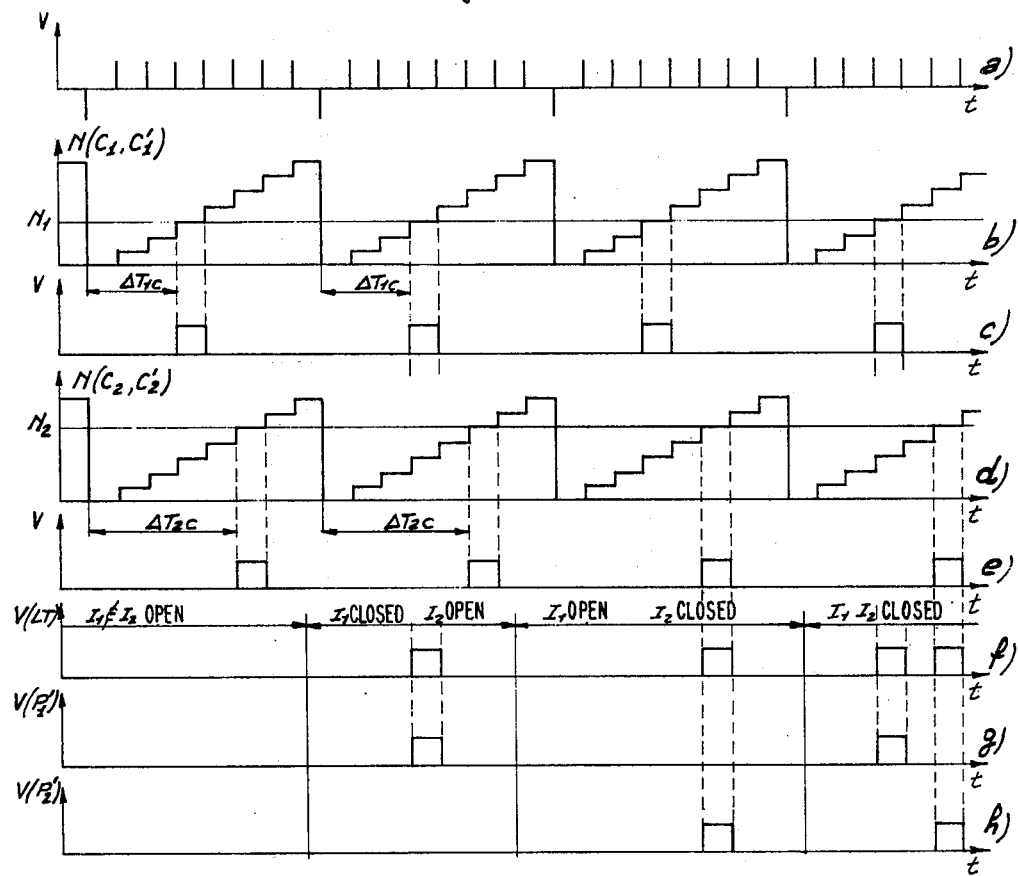
FIG. 5 is an operation diagram of the embodiment shown in FIG. 4.

In the embodiment shown in FIG. 4, each of the timing circuits comprise an electronic counter and a comparing circuit. The timing circuits defining the first and second plurality of timing circuits are designated $C_1$-$CS_1$, $C_2$-$CS_2$ and $C_1'$-$CS_1'$, $C_2'$-$CS_2'$, respectively. For purposes of illustration, it will be assumed that timing circuit $C_1$-$CS_1$ is operatively coupled with $C_1'$-$CS_1'$ and timing circuit $C_2$-$CS_2$ with $C_2'$-$CS_2'$. That is, it will be assumed that the characteristic times for $C_1$-$CS_1$ and $C_1'$-$CS_1'$ are identical while the characteristic times for $C_2$-$CS_2$ and $C_2'$-$CS_2'$ are identical.

The inputs of counters $C_1$, $C_2$, $C_1'$ and $C_2'$ are connected to line LD (which is separated from line LT), either directly or through zeroing devices $DA_1$, $DA_2$, $DA_1'$ and $DA_2'$, for receiving both the counting pulses (see positive pulses of FIG. 5a) and time interval initiating pulses (see negative pulses of FIG. 5a) supplied by clock $CK_2$.

Comparing circuits $CS_1$, $CS_2$, $CS_1'$ and $CS_2'$ compare a characteristic value of their own with the count in its associated counter. Since $C_1$-$CS_1$ is operatively coupled to $C_1'$-$CS_1'$, the characteristic value of circuit $CS_1$ is the same as that of circuit $CS_1'$. Similarly, the characteristic value of circuit $CS_2$ is the same as that of circuit $CS_2'$. The characteristic value of each of the comparing circuits define the characteristic time interval following which, from counter zeroing or resetting (i.e. the initiation of each system timing period), each of the timing circuits generates a gating signal.

In FIG. 5b, there is shown at $N_1$ the characteristic value of circuits $CS_1$ and $CS_1'$, which is compared with the count level of counters $C_1$ and $C_1'$, and at $\Delta T_{1C}$ the characteristic time of the coupled timing circuits $C_1$-$CS_1$ and $C_1'$-$CS_1'$. In the example, value $N_1$ is cyclically attained after time interval $\Delta T_{1C}$ defined by three counter counting pulses.

If switch $I_1$ is closed for a sufficient time after the termination of each time interval $\Delta T_{1C}$, inputs 1 and 2 of gate $P_1'$ will have simultaneously applied thereto the two gating signals supplied directly from circuit $CS_1'$ and through line LT from circuit $CS_1$, of which one is shown in FIG. 5c. Then, at output 3 of gate $P_1'$, a pilot signal will appear for operation of the respective operating device.

Similarly, at $N_2$ larger than $N_1$, there is shown the characteristic value of circuits $C_2$ and $C_2'$, and at $\Delta T_{2C}$ larger than $\Delta T_{1C}$ the characteristic time of the coupled timing circuits $C_2$-$CS_2$ and $C_2'$-$CS_2'$. See FIGS. 5d and 5a. In the example, value $N_2$ is cyclically attained after interval time $\Delta T_{2C}$ by five counter counting pulses.

Should switch $I_2$ be closed for a sufficient time after the termination of time interval $\Delta T_{2C}$, inputs 1 and 2 of gate $P_2'$ would have simultaneously applied thereto the two gating signals supplied from circuits $CS_2$ and $CS_2'$, of which one is shown in FIG. 5e. In such a case, a pilot signal will appear at output 3 of gate $P_2'$. As to FIGS. 5f, 5g and 5h, the same is true as explained in connection with FIGS. 5c, 5d and 5e.

Figure 6:
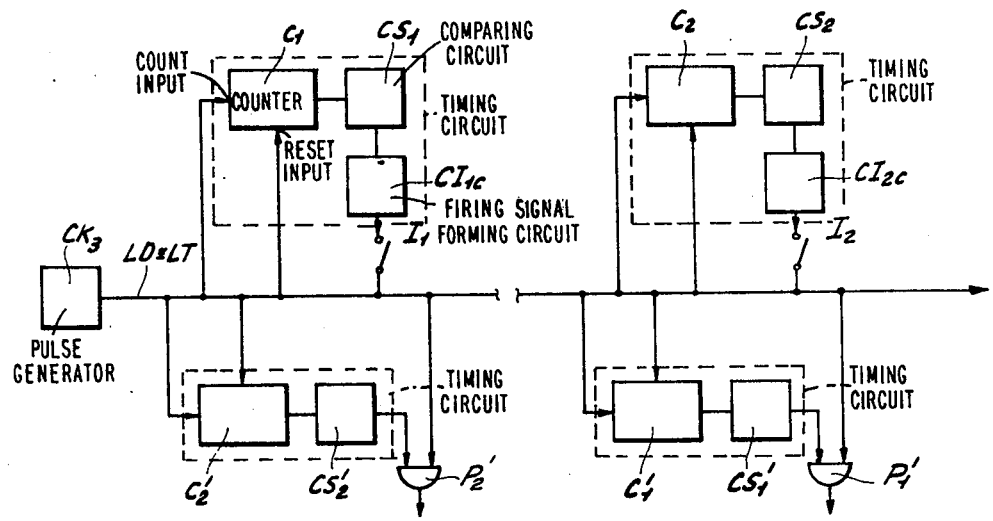
FIG. 6 shows a third embodiment for the system of FIG. 1.
Figure 7:
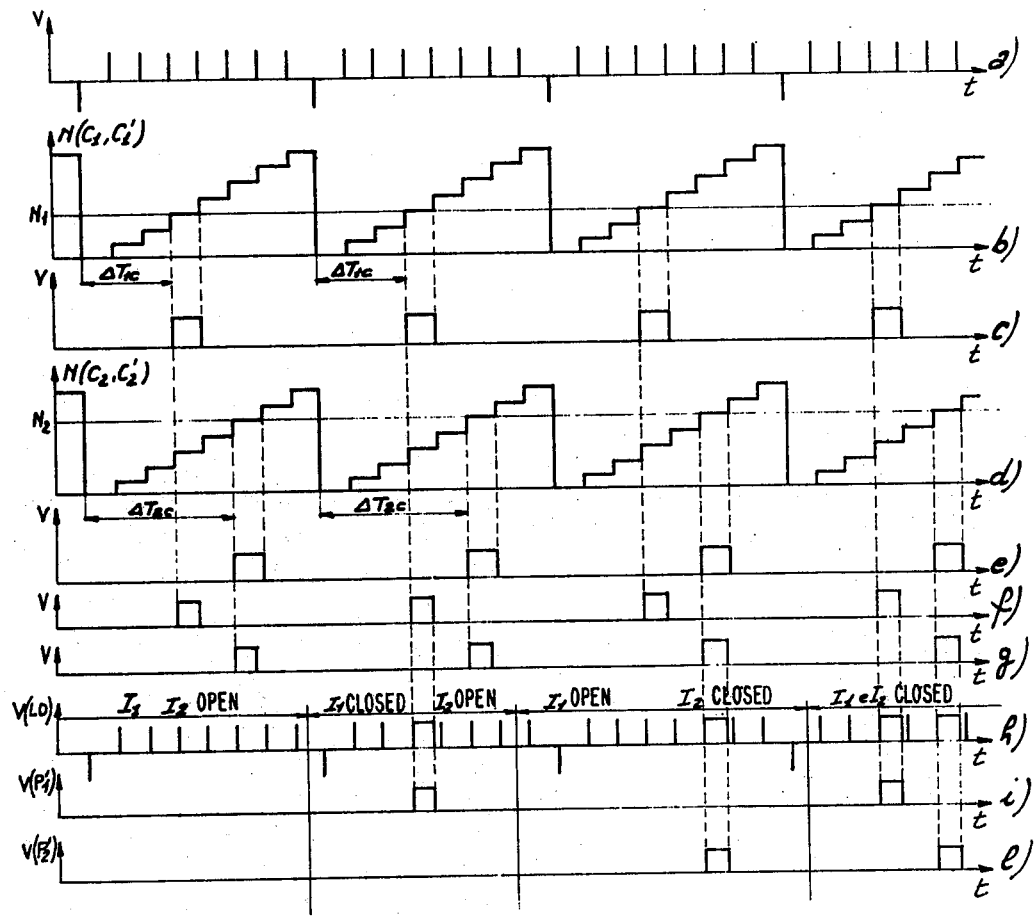
FIG. 7 shows an operation diagram of the embodiment shown in FIG. 6.
Figure 8:
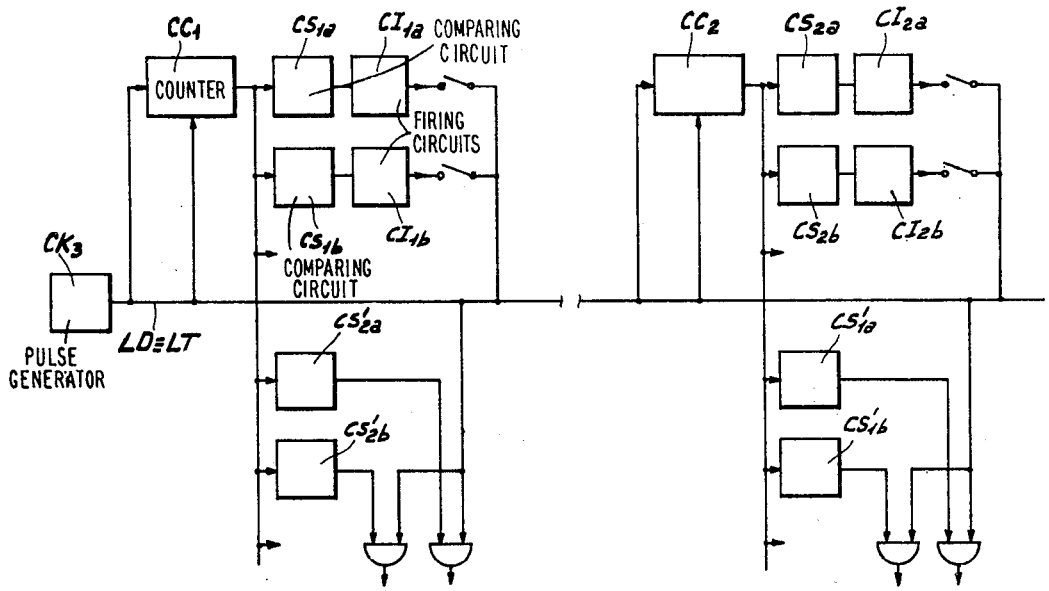
FIG. 8 shows a fourth embodiment for the system of FIG. 1.

In the embodiments shown in FIGS. 6 and 8, comprising two variants or modifications to the embodiment of FIG. 4, only line LD is used. In these embodiments, line LD serves to distribute both the pulses of clock CK3, and to transmit the gating signals. In both embodiments, the counter zeroing or resetting device has been omitted and the three types of signals (that is, counting pulses, time period initiation pulses and gating signals) to be supplied on the single line are suitably differentiated. To this end, and referring to FIG. 7, the count signals may be positive pulses, the time period initiator pulses may be negative pulses (see FIG. 7a), and the gating signals may be positive pulses having a duration which is longer than that of the count pulses but which are of less duration less than the interval between two clock consecutive pulses (see FIGS. 7f and 7g). Again, such signals are provided by firing circuits having the function of forming circuits.

FIG. 6 shows the firing-signal forming circuits $CI_{1C}$ and $CI_{2C}$ connected between the comparing circuits $CS_1$ and $CS_2$ and switches $I_1$ and $I_2$. FIGS. 7h, 7i and 7l, respectively, show the signals appearing on line LD and at the output of gates $P_1'$ and $P_2'$ under the several opening and closing conditions of switches $I_1$ and $I_2$. Of course, gates $P_1'$ and $P_2'$ are nonresponsive to the pulses of clock $CK_3$. FIGS. 7b, 7c, 7d and 7e correspond to FIGS. 5b, 5c, 5d and 5e.

Similarly, in the embodiment of FIG. 8, $CI_{1a}$, $CI_{1b}$, $CI_{2a}$ and $CI_{2b}$ respectively denote the firing-signal forming circuits at the output of comparing circuits $CS_{1a}$, $CS_{1b}$, $CS_{2a}$ and $CS_{2b}$. In this embodiment, the comparing circuits compare their respective characteristic value with the count level of a common counter. In the example, circuits $CS_{1a}$, $CS_{1b}$, $CS_{2a}'$ and $CS_{2b}'$ compare the output of counter $CC_1$ and circuits $CS_{2a}$, $CS_{2b}$, $CS_{1a}'$ and $CS_{1b}'$ compare the output of counter $CC_2$.

In the foregoing discussion, it was referred by way of example to such comparing circuits as to provide a comparison between two quantities, that is the count level of the counter and the characteristic level of the comparing circuit.

However, it is evident that the foregoing is also true where the comparison is effected between logical networks, in which case the gating signal is emitted when the logical configuration of the comparing circuits is coincident with that of the counter.

Figure 9:
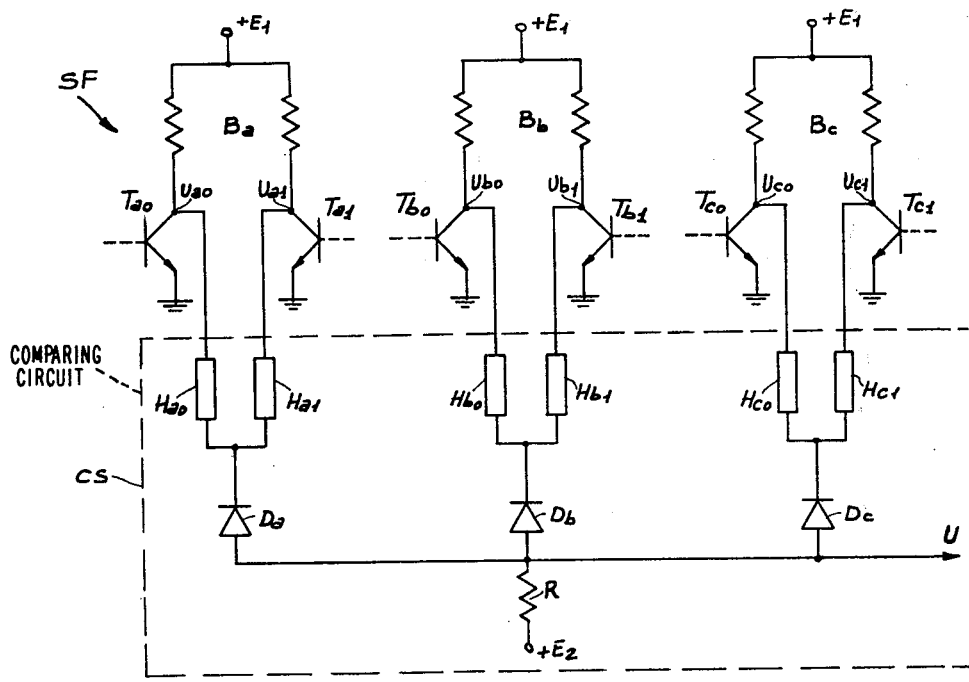
FIG. 9 shows an embodiment for an end portion of a timing circuit.

FIG. 9 illustrates a simple embodiment for a comparing circuit CS made of logical networks and connected to the end stage SF of an electronic counter having three binary stages, each of which comprising a bistable circuit (flip-flop) $B_a$, $B_b$ and $B_c$. Each of said flip-flops are provided with two transistors $T_{ao}$-$T_{a1}$, $T_{bo}$-$T_{b1}$ and $T_{co}$-$T_{c1}$, having the emitters thereof grounded, the collectors comprising the outputs connected to power supply $+E_1$ through respective resistors, and the bases connected to the remaining part of the counter circuit, not shown.

Comparing circuit CS comprises three diodes $D_a$, $D_b$ and $D_c$, the cathode of which are respectively connected both to the collectors of transistors $T_{ao}$, $T_{bo}$ and $T_{co}$ through disconnectable connections $H_{ao}$, $H_{bo}$ and $H_{co}$ and to the collectors of transistors $T_{a1}$, $T_{b1}$ and $T_{c1}$ through disconnectable connections $H_{a1}$, $H_{b1}$ and $H_{c1}$, and the anodes of which, as connected to form output U, are supplied through a common resistor R from supply $+E_2$.

Connections $H_{ao}$, $H_{a1}$, $H_{bo}$, $H_{b1}$, $H_{co}$ and $H_{c1}$ are connections or jumpers that are variously cut off depending on the logical combination by which the logical combination of the counters is to be compared.

Assume that after the counter resetting pulse, the logical configuration at outputs $U_{ao}$-$U_{a1}$, $U_{bo}$-$U_{b1}$ and $U_{co}$-$U_{c1}$ of flip-flops $B_a$, $B_b$ and $B_c$ is 01, 01, 01, it results that the configurations at said outputs will be 10, 10, 01 at the third count pulse, and 10, 01, 10 at the fifth count pulse.

Therefore, it is apparent that when desiring to provide for the gating signal of FIGS. 5c and 7c, it will be required to break or cut off connections $H_{a1}$, $H_{b1}$ and $H_{co}$ so that no diode has its cathode grounded, while just at the third pulse a positive signal is provided at output U.

Similarly, when desiring to provide for the gating signal of FIGS. 5e and 7e, connections $H_{a1}$, $H_{bo}$ and $H_{c1}$ will have to be cut off so that no diode has its cathode grounded, while just at the fifth pulse a positive signal is provided at output U.

Cut off of the connections can be mechanically or electrically accomplished; in this latter case, the connections comprise fuses and cut off is provided by applying a suitable voltage supply to output U, after prearranging the outputs of flip-flops at the logical configuration corresponding to the desired logical combination.

Reference was made to a three-diode type of comparing circuit CS, but it is apparent that diodes and associated connections would vary depending on the amount of bistable circuits or flip-flops of the end stage of the counter.

The advantage of said comparing circuit is that the some can be provided in series, and can be subsequently coded depending on requirements by merely cutting off the connections.

What is claimed is:

1. A system for generating a plurality of pilot signals comprising:
   means for generating a succession of time period initiation pulses, each of said time period initiation pulses defining a different system time period;
   a first set of timing circuits comprising a plurality of timing circuits, each timing circuit in said first set of timing circuits having a characteristic time interval associated therewith, the characteristic time interval associated with each timing circuit in said first of timing circuits being different than the characteristic time interval of at least one other timing circuit in said first set of timing circuits, each said timing circuit in said first set of timing circuits adapted to generate a gating pulse at its output responsive to the generation of each of said time period initiation pulses and after a time delay equal to the characteristic time interval associated therewith;
   a second set of timing circuits comprising a plurality of timing circuits, each timing circuit in said second set of timing circuits having a characteristic time interval associated therewith, the characteristic time interval associated with each timing circuit in said second set of timing circuits being identical to the characteristic time interval of at least one timing circuit in said first set of timing circuits whereby operative couplings between said timing circuits of said first and second sets of timing circuits are provided, each said timing circuit in said second set of timing circuits adapted to generate a gating pulse at its output responsive to the generation of each of said time period initiation pulses and after a time delay equal to the characteristic time interval associated therewith;
   a pulse distribution line connected to an output of said time period initiating pulse generating means and receiving said time period initiation pulses;
   means for coupling each of said timing circuits in said first and second set of timing circuits to said pulse distribution line;
   a plurality of receiver devices each having first and second inputs and an output, each of said receiver devices adapted to generate a pilot signal at its output when gating signals are simultaneously applied to both its inputs, each said receiver device associated with a different timing circuit in said second set of timing circuits and thereby associated with the characteristic time interval of its associated timing circuit;
   a transmission line;
   means for coupling the output of each of said timing circuits in said second set of timing circuits to said first input of the receiver device with which it is associated;
   a plurality of normally opened switches equal in number to the number of said timing circuits in said first set of timing circuits, each of said normally open switches associated with a different one of said timing circuits in said first set of timing circuits and thereby associated with the characteristic time interval of its associated timing circuit, each of said switches for applying a gating signal generated by its associated timing circuit to said transmission line when its associated switch is selectively closed by an operator of said system; and
   means for coupling said transmission line to said second input of each of said receiver devices whereby a pilot signal is generated at the output of any receiver device whose associated characteristic time interval is identical to the characteristic time interval associated with a normally open switch which has been selectively closed by an operator of said system.

2. The system of claim 1 wherein said time period initiation pulse generating means comprises a high frequency clock.

3. The system of claim 1 further including a plurality of switch means equal in number to the number of said receiver devices, each of said switch means being associated with a different one of said receiver devices, each of said switch means adapted to apply power from a power source to an operating device responsive to the generation of a pilot signal by its associated receiver device.

4. The system of claim 1 wherein each of said timing circuits comprises:
   a monostable multivibrator connected to said pulse distribution line and adapted to generate an output pulse responsive to each of said time period initiating pulses, the pulse width of each of said output pulses being equal to the characteristic time interval associated with said timing circuit;
   a signal firing circuit responsive to said output pulse generated by said monostable multivibrator for generating a gating pulse having a predetermined pulse width at the end of said associated characteristic time interval.

5. The system of claim 4 wherein each of said receiver devices is an AND gate.

6. The system of claim 1 wherein said time period initiation pulse generator means generates a plurality of counting pulses during each said system time period and applies said counting pulses to said pulse distribution line, and wherein each of said timing circuits comprises:
   counter means coupled to said pulse distribution line, said counter means for counting the number of pulses generated during each said system time period, the count in said counter means being reset each time a new said time period initiating pulse is generated; and
   comparator circuit means coupled to said counter means for generating a gating signal whenever the count in said counter means reaches a predetermined value corresponding to the characteristic time interval of said timing circuit.

7. The system of claim 6 wherein each said counter means comprises a digital counter having a count input, a reset input, and an output, and wherein said means for coupling said timing circuits to said pulse distribution line comprises;
   means for applying each of said time period initiating pulses to said count input of said counter; and
   resetting means for applying each of said time period initiation pulses to said reset input of said counter.

8. The system of claim 6 wherein each of said comparator circuit means comprises:
   a comparison circuit coupled to the output of said counter means, said comparison circuit to generate an output signal at the end of the characteristic time interval associated with said timing circuit; and
   a firing signal forming circuit coupled to said comparison circuit for generating a gating pulse responsive to said output signal generated by said comparison circuit.

9. The system of claim 7 wherein at least two comparing circuit means compare the count of a common counter means.

10. The system of claim 6 wherein each of said counter means comprises an electronic counter having a plurality of binary output stages, each defined by a bistable circuit; and
   said comparator circuit means comprises a logical AND gate having a plurality of inputs, each of the inputs of said AND gate being connected to the two outputs of said bistable circuits by two disconnectable connections.

11. The system of claim 10 wherein said disconnectable connections are fuses.

12. The system for generating a plurality of pilot signals comprising:
   means for generating a succession of time period initiation pulses, each of said time period initiation pulses defining a different system time period;
   a first set of timing circuits comprising a plurality of timing circuits, each timing circuit in said first set of timing circuits having a characteristic time interval associated therewith, the characteristic time interval associated with each timing circuit in said first set of timing circuits being different than the characteristic time interval of at least one other timing circuit in said first set of timing circuits, each said timing circuit in said first set of timing circuits adapted to generate a gating pulse at its output responsive to the generation of each of said time period initiation pulses and after a time delay equal to the characteristic time interval associated therewith;
   a second set of timing circuits including a plurality of timing circuits, each timing circuit in said second set of timing circuits having a characteristic time interval associated therewith, the characteristic time interval associated with each timing circuit in said second set of timing circuits being identical to the characteristic time interval of at least one timing circuit in said first set of timing circuits whereby operative couplings between said timing circuits of said first and second sets of timing circuits are provided, each said timing circuit in said second set of timing circuits adapted to generate a gating pulse at its output responsive to the generation of each of said time period initiation pulses and after a time delay equal to the characteristic time interval associated therewith;
   a plurality of receiver devices each having first and second inputs and an output, each of said receiver devices adapted to generate a pilot signal at its output when gating signals are simultaneously applied to both its inputs, each said receiver device associated with a different time circuit in said second set of timing circuits and thereby associated with the characteristic time interval of its associated timing circuit;
   a transmission line connected to an output of said time period initiation pulse generating means and receiving said time period initiation pulses;
   means for coupling each of said timing circuits in said first and second set of timing circuits to said transmission line;
   means for coupling the output of each of said timing circuits in said second of said timing circuits to said first input of the receiver device with which it is associated;
   a plurality of normally open switches equal in number to the number of said timing circuits in said first set of timing circuits, each of said normally open switches associated with a different one of said timing circuits in said first set of timing circuits and thereby associated with the characteristic time interval of its associated timing circuit, each of said switches for applying a gating signal generated by its associated timing circuit to said transmission line when its associated switch is selectively closed by an operator of said system; and
   means for coupling said transmission line to said second input of each of said receiver devices whereby a pilot signal is generated at the output of any receiver device whose associated characteristic time interval is identical to the characteristic time interval associated with the normally open switch which has been selectively closed by an operator of said system.

13. The system of claim 12 wherein said time period initiation pulse generator means generates a plurality of counting pulses during each said system time periods and applies said counting pulses to said transmission line, and wherein each of said timing circuits comprises:
   counter means coupled to said transmission line, said counter means for counting the number of pulses generated during each said system time period, the count in said counter means being reset each time a new said time period initiating pulse is generated; and
   a comparator circuit means coupled to said counter means for generating a gating signal whenever the count in said counter means reaches a predetermined value corresponding to the characteristic time interval of said timing circuit.

14. The system of claim 13 wherein each said counter means comprises a digital counter having a count input, a reset input, and an output, and wherein said means for coupling said timing circuits to said transmission line comprises:
   means for applying each of said counting pulses to said count inputs of said counters; and
   resetting means for applying each of said time period initiation pulses to said reset inputs of said counters.

15. The system of claim 13 wherein each of said comparator circuit means comprises:
   a comparison circuit coupled to the output of said counter means, said comparison circuit to generate an output signal at the end of the characteristic time interval associated with said timing circuit; and
   a firing signal forming circuit coupled to said comparison circuit for generating a gating pulse responsive to said output signal generated by said comparison circuit.

* * * * *